US012512762B2

(12) United States Patent
Winter et al.

(10) Patent No.: US 12,512,762 B2
(45) Date of Patent: Dec. 30, 2025

(54) CONTROL METHOD FOR A DC-DC CONVERTER AND DC-DC CONVERTER

(71) Applicant: Robert Bosch GmbH, Stuttgart (DE)

(72) Inventors: Christian Winter, Tamm (DE); Jan Riedel, Esslingen am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 219 days.

(21) Appl. No.: 17/638,928

(22) PCT Filed: Jul. 13, 2020

(86) PCT No.: PCT/EP2020/069726
§ 371 (c)(1),
(2) Date: Feb. 28, 2022

(87) PCT Pub. No.: WO2021/037433
PCT Pub. Date: Mar. 4, 2021

(65) Prior Publication Data
US 2022/0302844 A1   Sep. 22, 2022

(30) Foreign Application Priority Data
Aug. 28, 2019  (DE) .................. 10 2019 212 888.2

(51) Int. Cl.
*H02M 3/335*     (2006.01)
*H02M 1/00*      (2006.01)
(52) U.S. Cl.
CPC .................. *H02M 3/33573* (2021.05); *H02M 3/33576* (2013.01); *H02M 3/33584* (2013.01); *H02M 3/33592* (2013.01); *H02M 1/0058* (2021.05)

(58) Field of Classification Search
CPC ................. H02M 1/00; H02M 1/0058; H02M 3/33573; H02M 3/33576; H02M 3/33584; H02M 3/33592
See application file for complete search history.

(56) References Cited

U.S. PATENT DOCUMENTS

| 9,455,641 | B2 * | 9/2016 | Kondo | .............. | H02M 3/33584 |
| 9,641,089 | B2 * | 5/2017 | Higaki | .............. | H02M 3/33584 |
| 9,748,855 | B2 * | 8/2017 | Lee | .................... | H02M 3/33592 |
| 9,837,908 | B2 * | 12/2017 | Suetomi | ............ | H02M 3/33584 |

(Continued)

FOREIGN PATENT DOCUMENTS

| CN | 103929065 A | 7/2014 |
| CN | 109874376 A | 6/2019 |

(Continued)

OTHER PUBLICATIONS

Translation of International Search Report for Application No. PCT/EP2020/069726 dated Sep. 10, 2020 (2 pages).

*Primary Examiner* — Yusef A Ahmed
(74) *Attorney, Agent, or Firm* — Michael Best & Friedrich LLP

(57) ABSTRACT

A method for controlling a DC-DC converter having a primary-side full-bridge, a secondary-side full-bridge and a transformer, which is arranged between the primary-side full-bridge and the secondary-side full-bridge, wherein the method includes controlling a diagonal branch in the secondary-side full-bridge while the primary side of the transformer is short-circuited by means of the primary-side full-bridge and controlling a diagonal branch in the primary-side full-bridge.

8 Claims, 3 Drawing Sheets

(56) References Cited

U.S. PATENT DOCUMENTS

| | | | | |
|---|---|---|---|---|
| 10,804,808 B1* | 10/2020 | Fu | | H02M 3/33576 |
| 11,121,634 B2* | 9/2021 | Tanaka | | H02M 3/33584 |
| 2012/0300502 A1* | 11/2012 | Shimada | | H02M 1/4258 |
| | | | | 363/17 |
| 2015/0214847 A1* | 7/2015 | Shimada | | H02M 3/01 |
| | | | | 363/17 |
| 2016/0087545 A1* | 3/2016 | Higaki | | H02M 3/33584 |
| | | | | 363/17 |
| 2017/0310212 A1* | 10/2017 | Higaki | | G05F 1/38 |
| 2017/0324334 A1* | 11/2017 | Fujihata | | H02M 1/08 |
| 2017/0324335 A1* | 11/2017 | Suetomi | | H02M 3/33584 |
| 2017/0324336 A1* | 11/2017 | Suetomi | | H02M 3/33584 |
| 2017/0324337 A1* | 11/2017 | Suetomi | | H02M 3/26 |
| 2018/0048240 A1* | 2/2018 | Hayasaki | | H02M 3/33507 |
| 2018/0183345 A1* | 6/2018 | Itoh | | H02M 1/32 |
| 2019/0173387 A1* | 6/2019 | Tanaka | | H02M 1/08 |
| 2019/0319542 A1* | 10/2019 | Denzner | | H02M 1/08 |
| 2020/0186046 A1* | 6/2020 | Tanaka | | H02M 1/32 |
| 2021/0083588 A1* | 3/2021 | Yaegaki | | H02M 1/32 |
| 2021/0249963 A1* | 8/2021 | Kajiyama | | H02M 3/33573 |
| 2022/0216805 A1* | 7/2022 | Itogawa | | H02M 3/33584 |
| 2022/0278623 A1* | 9/2022 | Winter | | H02M 1/0058 |
| 2022/0278625 A1* | 9/2022 | Hirota | | H02M 1/0058 |
| 2022/0302844 A1* | 9/2022 | Winter | | H02M 3/33573 |
| 2022/0360181 A1* | 11/2022 | Winter | | H02M 3/33592 |
| 2022/0393606 A1* | 12/2022 | Itogawa | | H02M 3/33584 |

FOREIGN PATENT DOCUMENTS

| | | |
|---|---|---|
| CN | 109980940 A | 7/2019 |
| DE | 102016200662 A1 | 7/2017 |
| DE | 102016220358 A1 | 4/2018 |
| EP | 3324528 A1 | 5/2018 |
| JP | 2018133964 A | 8/2018 |
| WO | 2018016106 A1 | 1/2018 |

* cited by examiner

CONTROL METHOD FOR A DC-DC CONVERTER AND DC-DC CONVERTER

BACKGROUND OF THE INVENTION

The present invention relates to a method for controlling a DC-DC converter, in particular a phase-shifted full-bridge DC-DC converter. In addition, the present invention relates to a DC-DC converter, such as, for example, a phase-shifted full-bridge DC-DC converter.

DC-DC converters are known for the conversion of a first DC voltage into a second DC voltage with a different voltage level. In particular, the group of DC-DC converters also includes so-called phase-shifted full-bridge DC-DC converters. These DC-DC converters can, under certain boundary conditions, also realize a power transfer from the secondary side to the primary side if active switching elements are also used on the secondary side. For example, DC-DC converters can be used to couple a high-voltage power supply system of an electric vehicle to the low-voltage power supply system of the vehicle and to transmit electrical energy between the two vehicle power supply systems of such an electric vehicle.

Document DE 10 2016 200 662 A1 discloses a bidirectional DC-DC converter for energy transmission between a high-voltage power supply system and a low-voltage power supply system of an electric vehicle. The converter comprises at least one transformer for DC-isolation of the two vehicle power supply systems, electronic switches for reversing the polarity of the windings of the transformer, and a control device for controlling the switches. In particular, the DC-DC converter is intended to enable charging of a DC-link capacitor on the high-voltage side.

SUMMARY OF THE INVENTION

The present invention discloses a method for controlling a DC-DC converter and a DC-DC converter.

Accordingly, the following is provided:

A method for controlling a DC-DC converter, in particular a phase-shifted full-bridge DC-DC converter. The DC-DC converter comprises a primary-side full-bridge and a secondary-side full-bridge. A transformer is provided between the primary-side full-bridge and the secondary-side full-bridge. The method comprises a step for controlling a diagonal branch of the secondary-side full-bridge. The diagonal branch of the secondary-side full-bridge is in this case controlled while the primary side of the transformer is short-circuited by means of the primary-side full-bridge. Furthermore, the method comprises a subsequent step for controlling a diagonal branch of the primary-side full-bridge.

Furthermore, the following is provided:

A DC-DC converter, in particular a phase-shifted full-bridge DC-DC converter. The DC-DC converter comprises a primary-side full-bridge, a secondary-side full-bridge and a transformer, which is arranged between the primary-side full-bridge and the secondary-side full-bridge. In particular, the primary-side full-bridge is designed to be coupled to a DC voltage source. The secondary-side full-bridge can be designed to be coupled to a consumer, in particular a DC voltage consumer and/or an electrical energy store. Furthermore, the DC-DC converter comprises a control device. The control device is designed to control the first full-bridge and the second full-bridge corresponding to the method according to the invention.

The present invention is based on the knowledge that in the case of conventional control methods for DC-DC converters, such as, for example, phase-shifted full-bridge DC-DC converters, some switching elements are sometimes hard-switched during discontinuous operation (discontinuous conduction mode, DCM), that is to say that control of the corresponding switching element takes place while an electrical voltage is present across the switching element. Such hard-switching of the switching element results in higher electrical losses than is the case, for example, in the case of soft-switching, in the case of which no or only a very low electrical voltage is present across the corresponding switching element.

It is therefore one concept of the present invention to take account of this knowledge and to provide an improved control method for a DC-DC converter, in which the switching elements of the DC-DC converter are preferably soft-switched. As a result, the electrical losses during the switching operations can be reduced. Furthermore, switching operations with no or only a low electrical voltage across the switching element also result in less loading for the corresponding switching element, with the result that the switching elements can be protected and therefore the life can be extended.

The switching of the DC-DC converter according to the invention can in this case take place completely on the basis of conventional hardware. Therefore, no further component parts and therefore no increased costs are required.

The method for controlling the DC-DC converter can in particular be used in the so-called discontinuous conduction mode (DCM). In particular, the control method can be used for so-called phase-shifted full-bridge DC-DC converters. For the adjustment according to the invention of the switching states on the secondary side of the DC-DC converter, a full-bridge having two half-bridges is in this case also required on the secondary side, wherein each half-bridge has two switching elements connected in series. Such a full-bridge on the secondary side of the DC-DC converter also enables active rectification in the case of conventional DC-DC converters.

By means of the switching elements of the secondary-side full-bridge, it is possible in this case in accordance with the invention to inject an electrical current in the transformer on the secondary side while the transformer is short-circuited on the primary side via at least two switching elements of the primary-side full-bridge. Owing to the injected current in the transformer, thereupon the switching elements of a diagonal branch in the primary-side full-bridge can be switched on using soft-switching.

In accordance with one embodiment, the method comprises a first part having a step for controlling a first diagonal branch in the secondary-side full-bridge while the primary side of the transformer is short-circuited by means of the primary-side full-bridge. Then, the switching elements which are in a first diagonal branch of the primary side are switched on. Thereupon, the terminals of the primary side of the transformer are connected electrically to one another by means of the primary-side full-bridge and therefore the primary side of the transformer is short-circuited. As the method continues, all of the switching elements in the secondary-side full-bridge are opened. In a second part, the method comprises a step for controlling a second diagonal branch in the secondary-side full-bridge while the primary side of the transformer is short-circuited by means of the primary-side full-bridge. Then, the switching elements of a second diagonal branch of the primary-side full-bridge are closed, i.e. switched on. Thereupon, the terminals of the primary side of the transformer are connected electrically to one another by means of the primary-side full-bridge, and therefore the primary side of the transformer is short-circuited. Finally, all of the switching elements of the secondary-side full-bridge are opened. In this case, the second diagonal branch of the secondary-side full-bridge is complementary to the first diagonal branch of the secondary-side full-bridge. In other words, whereas in the first part an upper switching element in a first half-bridge and a lower switching element in a second half-bridge are controlled, in the second part control of an upper switching element in the second half-bridge and control of a lower switching element in the first half-bridge of the full-bridge take place. Similarly, the second diagonal branch of the primary-side full-bridge is complementary to the first diagonal branch of the primary-side full-bridge.

In accordance with one embodiment, the activation of the diagonal branch in the primary-side full-bridge takes place once the diagonal branch in the secondary-side full-bridge has been controlled for a predetermined time period. As a result, in the predetermined time period during which the diagonal branch of the secondary-side full-bridge is controlled, an electrical current in the turns of the transformer can be set. The electrical current will generally rise continuously during the predetermined time period.

In accordance with one embodiment, the short-circuiting of the primary side of the transformer can take place by means of closing of the two upper switching elements or of the two lower switching elements of the primary-side full-bridge. If the two upper switching elements or the two lower switching elements of the primary-side full-bridge are closed at the same time, an electrical connection can be set between the terminals of the primary side of the transformer via the corresponding switching elements.

In accordance with one embodiment, the short-circuiting of the primary side of the transformer takes place alternately by means of the upper switching elements of the primary-side full-bridge and the lower switching elements of the primary-side full-bridge. By virtue of the alternate control of the upper or lower switching elements of the full-bridge, the respective switching elements can be loaded uniformly. This results in as undamaging and uniform heating as possible.

In accordance with one embodiment, the opening of the switching elements of the secondary-side full-bridge takes place as soon as an electrical current in the transformer has decayed. In particular, the switching elements of the secondary-side full-bridge can be opened when the electrical current on the secondary side of the transformer has decayed down to zero.

In accordance with one embodiment, the opening of the switching elements of the secondary-side full-bridge takes place even before an electrical current in the transformer has completely decayed. In this case, the electrical current can then flow through the diodes provided in parallel with the switching elements until the electrical current has completely decayed. In this way, it is possible to ensure that the switching elements of the secondary-side full-bridge are actually open when the electrical current on the secondary side of the transformer has completely decayed.

The above configurations and developments can be combined with one another as desired, insofar as this is sensible. Further configurations, developments and implementations of the invention also include combinations which have not been explicitly mentioned of features of the invention which have been described above or below in relation to the exemplary embodiments. In particular, in this case a person skilled in the art will also add individual aspects as improvements or additions to the respective basic forms of the invention.

BRIEF DESCRIPTION OF THE DRAWINGS

Further features and advantages of the invention will be explained below with reference to the figures, in which.

DETAILED DESCRIPTION

Figure 1:
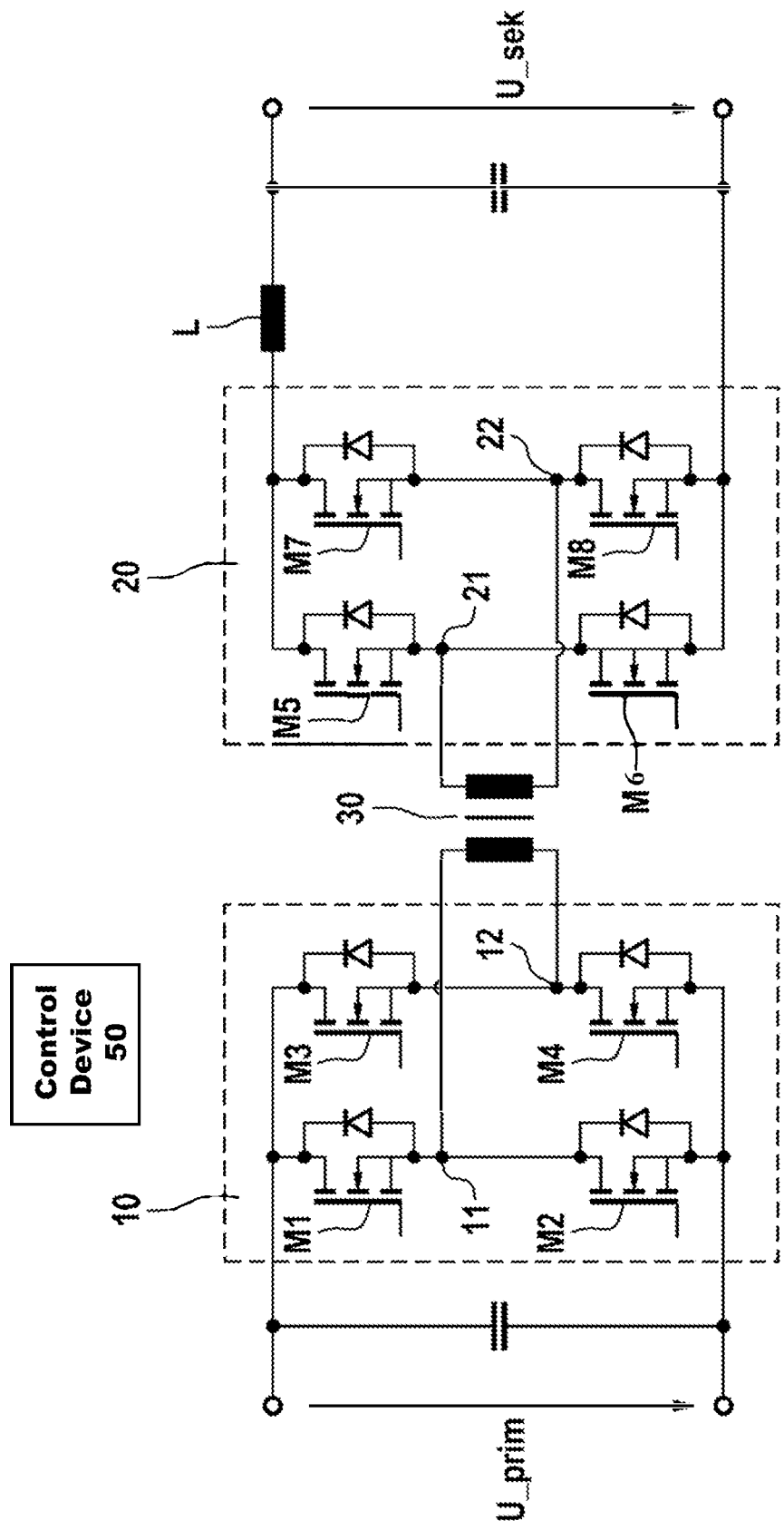
FIG. 1 shows a schematic illustration of a basic circuit diagram, as forms the basis of a DC-DC converter in accordance with one embodiment.

FIG. 1 shows a schematic illustration of a basic circuit diagram, as forms the basis of a DC-DC converter 1 in accordance with one embodiment. The DC-DC converter 1 comprises a primary-side full-bridge 10 and a secondary-side full-bridge 20. A transformer 30 is provided between the primary-side full-bridge 10 and the secondary-side full-bridge 20. The primary-side full-bridge 10 comprises two half-bridges each having two switching elements. A first switching element M1 is arranged between a first input terminal on the primary side of the DC-DC converter and a first node 11. A second switching element M2 is arranged between the first node 11 and a second input terminal of the primary side of the DC-DC converter 1. The first switching element M1 and the second switching element M2 form the first half-bridge of the first full-bridge 10. The second half-bridge of the full-bridge 10 comprises the two switching elements M3 and M4. The third switching element M3 is arranged between the first input terminal of the primary side of the DC-DC converter 1 and a second node 12. The fourth switching element M4 is arranged between the second node 12 and the second input terminal of the primary side of the DC-DC converter 1. The first node 11 is connected to a first terminal of the primary side of the transformer 30, and the second node 12 is connected to a second terminal of the primary side of the transformer 30.

The secondary-side full-bridge 20 likewise comprises two half-bridges each having two switching elements. Correspondingly, a fifth switching element M5 is arranged between a first terminal of the secondary side of the DC-DC converter 1 and a third node 21. A sixth switching element M6 is arranged between the third node 21 and a second terminal of the secondary side of the DC-DC converter 1. A seventh switching element M7 is arranged between the first terminal of the secondary side of the DC-DC converter 1 and a fourth node 22. An eighth switching element M8 is arranged between the fourth node 22 and the second terminal of the secondary side of the DC-DC converter 1. A series inductance L can be provided between a connecting point of the fifth switching element M5 and the seventh switching element M7 on one side and the first terminal of the secondary side of the DC-DC converter 1 on the other side. Furthermore, in each case one capacitor can be provided both on the input side and on the output side. A control device 50 is provided for controlling the switching elements M1 to M4 of the primary-side full-bridge 10 and the switching elements M5 to M8 of the secondary-side full-bridge 20. The control device 50 can control the switching elements in particular corresponding to the method described below.

Figure 2:
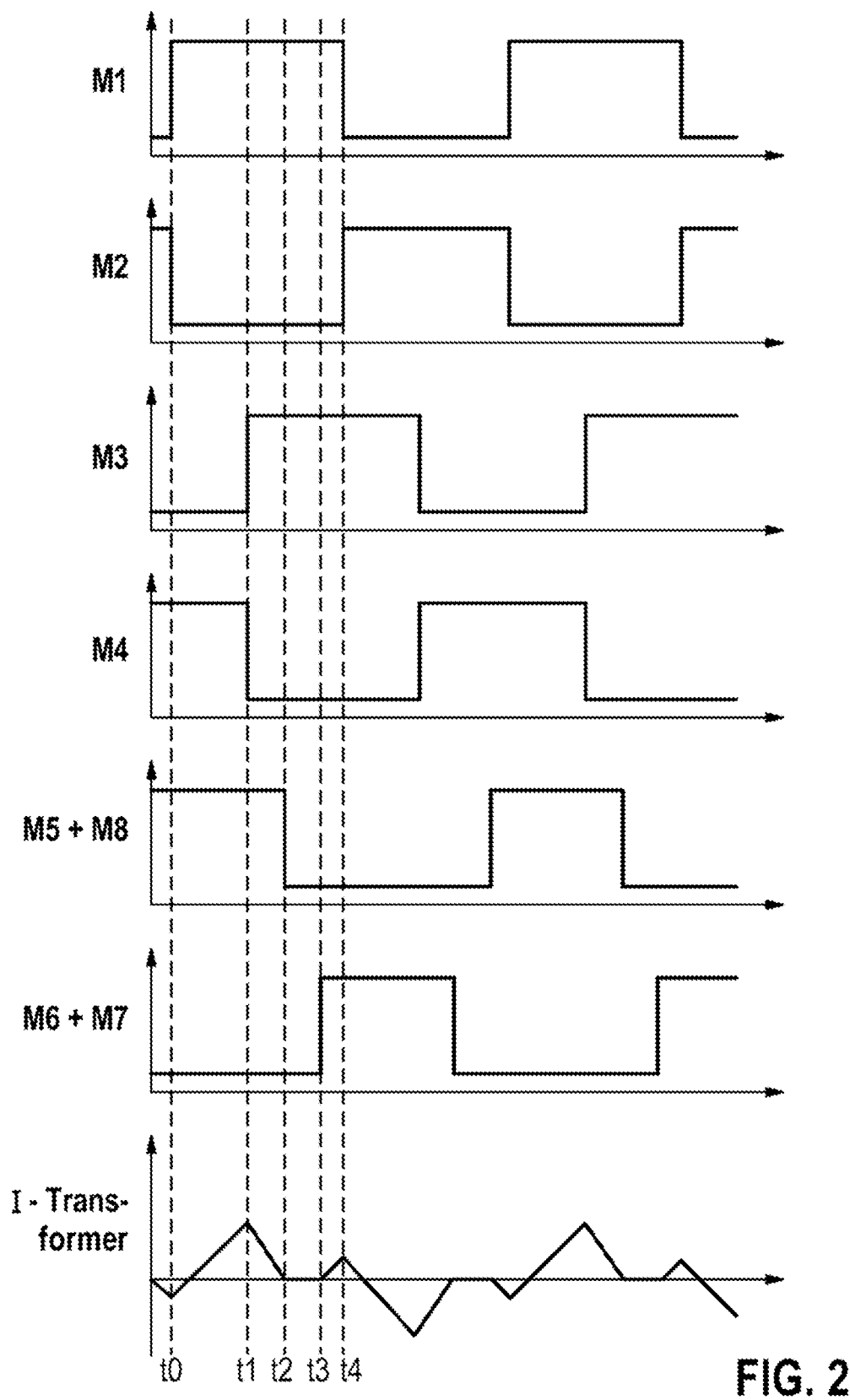
FIG. 2 shows a timing diagram for a sequence of switching states, as forms the basis of a method for operating the DC-DC converter in accordance with one embodiment.

FIG. 2 shows a timing diagram for the switching states of the switching elements in the primary-side full-bridge 10 and the secondary-side full-bridge 20 as well as the transformer current I which is set thereupon.

As can be seen in this diagram, prior to time t0, the two lower switching elements M2 and M4 of the primary-side full-bridge 10 are on and therefore closed. As a result, the primary side of the transformer 30 is short-circuited. Furthermore, shortly before time t0, the switching elements M5 and M8 in a first diagonal branch of the secondary-side full-bridge 20 are closed and the switching elements M6 and M7 of the other diagonal branch are open. In this way, it is possible for electrical energy to be fed into the transformer 30 from the secondary side of the DC-DC converter 1, for example from a capacitor connected on the secondary side, and the electrical current in the transformer 30 begins to rise (in this case in the negative direction). The slope of the current rise is in this case determined by the series inductance L and the parasitic inductances of the transformer 30.

At time t0, the first switching element M1 in the primary-side full-bridge 10 is closed, and the second switching element M2 is opened. In this way, a first diagonal branch via the first switching element M1 and the fourth switching element M4 in the primary-side full-bridge 10 is active, whereas the switching elements M2 and M3 of the other diagonal branch are open. In this case, first the opening of the second switching element M2 takes place and, after a dead time, the closing of the first switching element M1 takes place. Owing to the negative transformer current at time to, it is possible for the first switching element M1 to be able to be switched on using soft-switching. Thereupon, the current across the output inductor L rises between time t0 and time t1.

At time t1, the switching elements M3 and M4 are switched. In particular, first the switching element M4 is opened and thereupon the switching element M3 is closed. Thereupon, the electrical current in the transformer 30 begins to decay. At the latest at time t2, thereupon the switching elements M5 and M8 of the active diagonal branch are also opened. In order to avoid any possible problems with the precise switch-off time of the secondary-side switches M5 and M8, said switches can also already be switched off prior to time t2. In this case, a remaining electrical current can flow away passively via the diodes provided in parallel with the switching elements. At time t3, the switching elements M6 and M7 of the diagonal branch in the secondary-side full-bridge 20 are closed. Thereupon, an electrical current in the transformer 30 begins to rise. At time t4, thereupon the primary-side short circuit of the transformer 30 is opened, and a diagonal branch is closed by the switching elements M2 and M3. In this case too, first the switching element M1 can be opened in order to eliminate the primary-side short circuit and, after a dead time, the switching element M2 can be closed. The further switching sequence in this case takes place corresponding to the sequence already described above, but with reverse polarity.

For a completely soft switching response, in this case either the generated ripple of the output current or the magnetization current needs to provide sufficient energy for recharging the switch capacitances. Typically, in particular the output inductance L is in this case so low that it does not represent a restriction.

Figure 3:
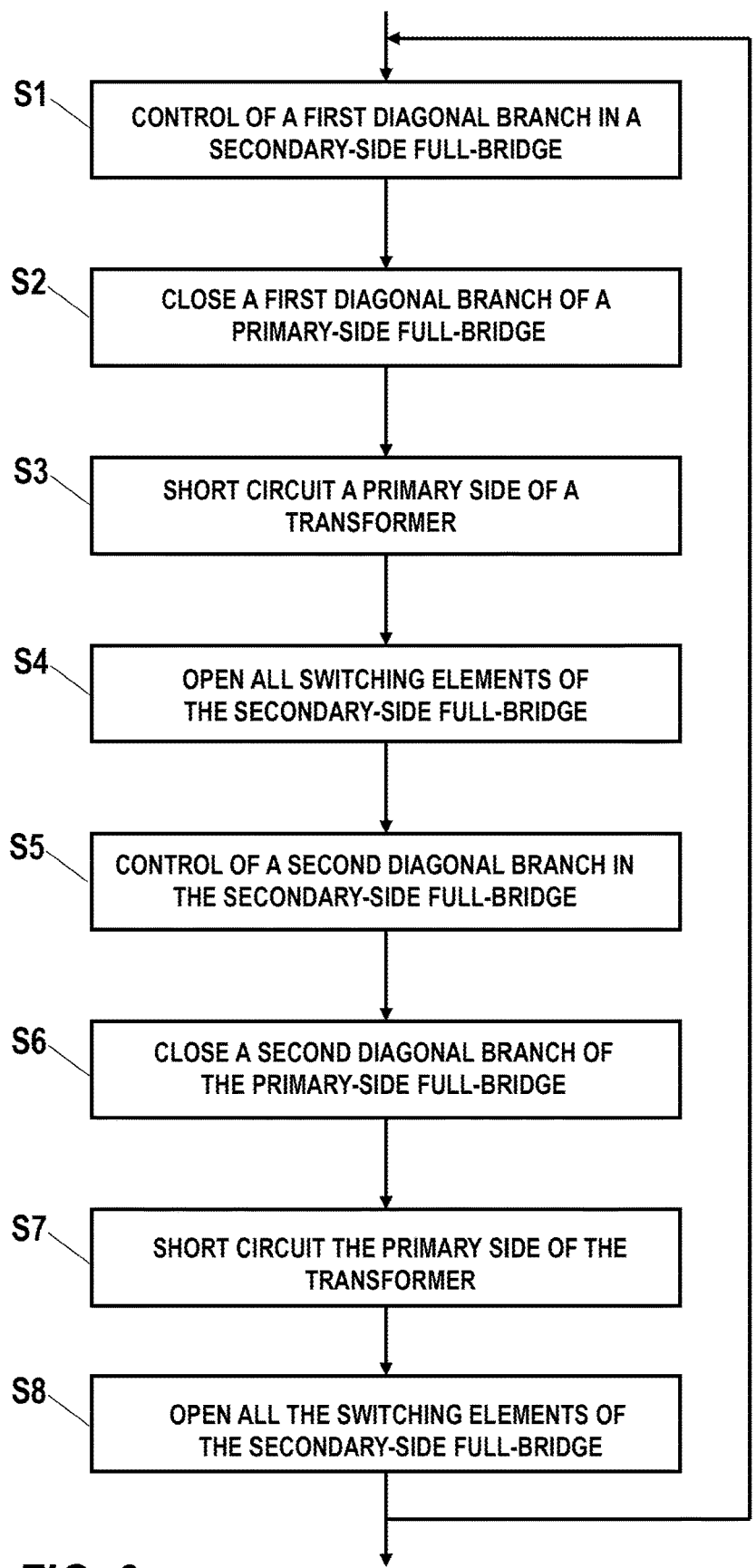
FIG. 3 shows a schematic illustration of a flowchart, as forms the basis of a method for controlling a DC-DC converter in accordance with one embodiment.

FIG. 3 shows a flowchart, as forms the basis of a method for controlling a DC-DC converter 1 in accordance with one embodiment. The method for controlling the DC-DC converter 1 can in this case in particular comprise steps as have been described previously in connection with the control of a DC-DC converter 1 in accordance with FIGS. 1 and 2. Furthermore, the above-described DC-DC converter 1 can also be designed to implement all of the steps described below.

In step S1, control of a first diagonal branch in the secondary-side full-bridge takes place. For example, the first diagonal branch can comprise the switching elements M5 and M6 of the secondary-side full-bridge. In particular, the switching elements of the secondary-side diagonal branch are controlled while the primary side of the transformer 30 is short-circuited.

In step S2, closing of a first diagonal branch of the primary-side full-bridge takes place. In step S3, the terminal elements on the primary side of the transformer 30 are connected electrically to one another by means of the primary-side full-bridge 10, and therefore the primary side of the transformer 30 is short-circuited. In step S4, opening of all of the switching elements of the secondary-side full-bridge takes place.

In a second part of the method, in step S5, control of a second diagonal branch in the secondary-side full-bridge takes place while the primary side of the transformer is short-circuited by means of the primary-side full-bridge. The second diagonal branch of the secondary-side full-bridge is in this case complementary to the first diagonal branch of the secondary-side full-bridge.

In step S6, closing of a second diagonal branch of the primary-side full-bridge takes place. The second diagonal branch of the primary-side full-bridge is in this case complementary to the first diagonal branch of the primary-side full-bridge. In step S7, the terminal elements are connected electrically to one another on the primary side of the transformer by means of the primary-side full-bridge 10, and therefore the primary side of the transformer 30 is short-circuited. In step S8, finally, opening of all of the switching elements of the secondary-side full-bridge takes place.

The above-described steps can be repeated periodically for energy transmission from the primary side to the secondary side of the DC-DC converter.

By way of summary, the present invention relates to a control method for a DC-DC converter for energy transmission from a primary side to the secondary side of the DC-DC converter. In this case, a special control method is proposed, which makes it possible to switch on the switching elements in the DC-DC converter predominantly using soft switching. Therefore, the losses during the control of the switching elements can be minimized. In particular, it is proposed to inject an electrical current into a short-circuit state of the primary side of the transformer by premature switch-on of the secondary-side diagonals for a settable time period.

The invention claimed is:

1. A method for controlling a DC-DC converter having a primary-side full-bridge, a secondary-side full-bridge, and a transformer, which is arranged between the primary-side full-bridge and the secondary-side full-bridge, wherein the method comprises the following steps:

closing two upper switching elements or two lower switching elements of the primary-side full-bridge to short-circuit the primary-side full-bridge;

controlling, by closing, a first diagonal branch in the secondary-side full-bridge while the primary side of the transformer is short-circuited;

subsequently, closing a first diagonal branch of the primary-side full-bridge and opening a first switching element of the two upper switching elements or the two lower switching elements of the primary-side full-bridge, wherein opening of the first switching element of the two upper switching elements or the two lower switching elements of the primary-side full-bridge occurs prior to closing one switching element of the first diagonal branch of the primary-side full-bridge, and wherein the closing of the one switching element of the first diagonal branch of the primary-side full-bridge occurs after a dead time;

subsequently, closing the other of the two upper switching elements or the two lower switching elements of the primary-side full-bridge to short-circuit the primary-side full-bridge;

subsequently, opening all of the switching elements in the secondary-side full-bridge;

subsequently, controlling, by closing, a second diagonal branch in the secondary-side full-bridge while the primary side of the transformer is short-circuited by means of the primary-side full-bridge, wherein the second diagonal branch of the secondary-side full-bridge is complementary to the first diagonal branch of the secondary-side full-bridge;

subsequently, closing a second diagonal branch of the primary-side full-bridge, wherein the second diagonal branch of the primary-side full-bridge is complementary to the first diagonal branch of the primary-side full-bridge, wherein the second diagonal branch of the primary-side full-bridge is closed after a dead time;

subsequently, short-circuiting the primary side of the transformer by means of the primary-side full-bridge; and subsequently, opening all of the switching elements in the secondary-side full-bridge.

2. The method as claimed in claim 1, wherein the closing of the first diagonal branch of the primary-side full-bridge takes place once the first diagonal branch of the secondary-side full-bridge has been controlled for a predetermined time period.

3. The method as claimed in claim 1, wherein an opening of the switching elements of the secondary-side full-bridge takes place as soon as an electrical current in the transformer has decayed.

4. The method as claimed in claim 1, wherein an opening of the switching elements of the secondary-side full-bridge takes place before an electrical current in the transformer has decayed.

5. The method of claim 1, wherein controlling the first diagonal branch in the secondary-side full-bridge comprises closing the first diagonal branch in the primary-side full-bridge while the second diagonal branch in the secondary-side full-bridge remains open.

6. The method of claim 1, wherein the DC-DC converter includes an inductor, which is arranged between a connecting point of two upper switching elements of the secondary side full-bridge of the DC-DC converter and a first terminal of the secondary side full-bridge of the DC-DC converter.

7. A DC-DC converter, comprising:
a primary-side full-bridge;
a secondary-side full-bridge;
a transformer, which is arranged between the primary-side full-bridge and the secondary-side full-bridge, and
a control device configured to
close two upper switching elements or two lower switching elements of the primary-side full-bridge to short-circuit the primary-side full-bridge;
control, by closing, a first diagonal branch in the secondary-side full-bridge while the primary side of the transformer is short-circuited;
subsequently, close a first diagonal branch of the primary-side full-bridge and opening a first switching element of the two upper switching elements or the two lower switching elements of the primary-side full-bridge, wherein opening of the first switching element of the two upper switching elements or the two lower switching elements of the primary-side full-bridge occurs prior to closing one switching element of the first diagonal branch of the primary-side full-bridge, and wherein the closing of the one switching element of the first diagonal branch of the primary-side full-bridge occurs after a dead time;
subsequently, close the other of the two upper switching elements or the two lower switching elements of the primary-side full-bridge to short-circuit the primary-side full-bridge;
subsequently, open all of the switching elements in the secondary-side full-bridge;
subsequently, control, by closing, a second diagonal branch in the secondary-side full-bridge while the primary side of the transformer is short-circuited by means of the primary-side full-bridge, wherein the second diagonal branch of the secondary-side full-bridge is complementary to the first diagonal branch of the secondary-side full-bridge;
subsequently, close a second diagonal branch of the primary-side full-bridge, wherein the second diagonal branch of the primary-side full-bridge is complementary to the first diagonal branch of the primary-side full-bridge, wherein the second diagonal branch of the primary-side full-bridge is closed after a dead time;
subsequently, short-circuit the primary side of the transformer by means of the primary-side full-bridge; and
subsequently, open all of the switching elements in the secondary-side full-bridge.

8. The DC-DC converter of claim 7, wherein control of the first diagonal branch in the secondary-side full-bridge comprises closing the first diagonal branch in the primary-side full-bridge while the second diagonal branch in the secondary-side full-bridge remains open.

* * * * *